United States Patent
Artuso

(10) Patent No.: US 12,369,114 B2
(45) Date of Patent: *Jul. 22, 2025

(54) DETERMINING A CELL TO WHICH TO CONNECT USER EQUIPMENT

(71) Applicant: T-Mobile USA, Inc., Bellevue, WA (US)

(72) Inventor: Daniel Artuso, Concord, CA (US)

(73) Assignee: T-Mobile USA, Inc., Bellevue, WA (US)

(*) Notice: Subject to any disclaimer, the term of this patent is extended or adjusted under 35 U.S.C. 154(b) by 432 days.

This patent is subject to a terminal disclaimer.

(21) Appl. No.: 17/951,102

(22) Filed: Sep. 23, 2022

(65) Prior Publication Data

US 2023/0019479 A1  Jan. 19, 2023

Related U.S. Application Data

(63) Continuation of application No. 17/244,281, filed on Apr. 29, 2021, now Pat. No. 11,490,329.

(51) Int. Cl.
| | |
|---|---|
| *H04W 48/20* | (2009.01) |
| *H04W 8/22* | (2009.01) |
| *H04W 64/00* | (2009.01) |
| *H04W 72/0453* | (2023.01) |
| *H04W 72/56* | (2023.01) |
| *H04W 76/10* | (2018.01) |

(52) U.S. Cl.
CPC ............ *H04W 48/20* (2013.01); *H04W 8/22* (2013.01); *H04W 64/006* (2013.01); *H04W 72/0453* (2013.01); *H04W 72/56* (2023.01); *H04W 76/10* (2018.02)

(58) Field of Classification Search
CPC ......... H04W 48/20; H04W 8/22; H04W 8/24; H04W 64/003; H04W 64/006; H04W 72/0453; H04W 72/56; H04W 76/10; H04W 16/18
See application file for complete search history.

(56) References Cited

U.S. PATENT DOCUMENTS

| | | |
|---|---|---|
| 5,602,903 A | 2/1997 | Leblanc et al. |
| 7,272,401 B2 | 9/2007 | Kim et al. |
| 7,430,420 B2 | 9/2008 | Derakhshan et al. |
| 7,818,015 B2 | 10/2010 | Karaoguz |
| 8,031,629 B2 | 10/2011 | Stegmaier et al. |
| 8,311,557 B2 | 11/2012 | Annamalai |
| 8,645,732 B2 | 2/2014 | Naware et al. |
| 9,103,677 B2 | 8/2015 | Bauchot et al. |
| 9,125,091 B2 | 9/2015 | Heo et al. |

(Continued)

*Primary Examiner* — Siu M Lee
(74) *Attorney, Agent, or Firm* — Perkins Coie LLP

(57) ABSTRACT

Disclosed here is a system and method to obtain a layer selection message from a wireless telecommunication network providing a wireless connection to a UE. The layer selection message includes a contour including an indication of a region served by a cell, an indication of a generation of wireless technology provided by the cell, a radio frequency band provided by the cell, and an indication of how to select the cell. The system can obtain a geographical location of the UE and a wireless capability of the UE. Based on the geographical location of the UE, the wireless capability of the UE, and the layer selection message, the system can determine a cell to which to connect the UE.

19 Claims, 7 Drawing Sheets

(56) References Cited

U.S. PATENT DOCUMENTS

| | | |
|---|---|---|
| 9,167,444 B2 | 10/2015 | Nuss et al. |
| 9,247,436 B2 | 1/2016 | Moore et al. |
| 9,277,475 B2 | 3/2016 | Song et al. |
| 9,277,529 B2 | 3/2016 | Godin et al. |
| 9,326,185 B2 | 4/2016 | Alisawi |
| 9,451,521 B2 | 9/2016 | Kapoulas et al. |
| 9,485,697 B1 | 11/2016 | Wang et al. |
| 9,603,078 B2 | 3/2017 | Kapoulas et al. |
| 9,674,880 B1 | 6/2017 | Egner et al. |
| 9,756,547 B2 | 9/2017 | Egner et al. |
| 9,780,823 B2 | 10/2017 | Egner et al. |
| 9,794,833 B1 | 10/2017 | Lei et al. |
| 9,877,139 B2 | 1/2018 | Venkatachalam et al. |
| 9,877,271 B2 | 1/2018 | Su |
| 9,942,810 B2 | 4/2018 | Lindoff et al. |
| 9,955,401 B2 | 4/2018 | Kapoulas et al. |
| 10,251,145 B2 | 4/2019 | Catovic et al. |
| 10,349,335 B2 | 7/2019 | Thubert et al. |
| 10,424,028 B2 | 9/2019 | Bender et al. |
| 10,499,410 B2 | 12/2019 | Egner et al. |
| 10,609,754 B2 | 3/2020 | Lei et al. |
| 11,490,329 B1* | 11/2022 | Artuso .................. H04W 48/20 |
| 11,516,715 B2* | 11/2022 | Matsuda ............... H04W 48/12 |
| 11,990,981 B2* | 5/2024 | Fan .................... H04B 7/18541 |
| 2005/0026597 A1 | 2/2005 | Kim et al. |
| 2005/0085239 A1 | 4/2005 | Cedervall |
| 2005/0192027 A1 | 9/2005 | Kim et al. |
| 2006/0140117 A1 | 6/2006 | Aerrabotu et al. |
| 2006/0142032 A1 | 6/2006 | Derakhshan et al. |
| 2007/0268852 A1 | 11/2007 | Stegmaier et al. |
| 2008/0096566 A1 | 4/2008 | Brunner et al. |
| 2009/0296650 A1 | 12/2009 | Venturino et al. |
| 2010/0153001 A1 | 6/2010 | Bauchot et al. |
| 2010/0240370 A1 | 9/2010 | Pandit et al. |
| 2010/0265913 A1 | 10/2010 | Gorokhov et al. |
| 2010/0291947 A1 | 11/2010 | Annamalai |
| 2011/0177815 A1* | 7/2011 | Jeong ................ H04W 36/0061 455/436 |
| 2013/0272132 A1 | 10/2013 | Heo et al. |
| 2014/0031006 A1 | 1/2014 | Moore et al. |
| 2014/0073317 A1 | 3/2014 | Zhou et al. |
| 2014/0153439 A1 | 6/2014 | Nuss et al. |
| 2014/0254359 A1 | 9/2014 | Alisawi |
| 2014/0302880 A1 | 10/2014 | Godin et al. |
| 2015/0036495 A1 | 2/2015 | Venkatachalam et al. |
| 2015/0092709 A1 | 4/2015 | Su |
| 2015/0141018 A1 | 5/2015 | Kapoulas et al. |
| 2015/0141021 A1 | 5/2015 | Kapoulas et al. |
| 2016/0021593 A1 | 1/2016 | Chou et al. |
| 2016/0095030 A1 | 3/2016 | Lindoff et al. |
| 2016/0337957 A1 | 11/2016 | Gonsalves et al. |
| 2016/0360465 A1 | 12/2016 | Kapoulas et al. |
| 2017/0055164 A1 | 2/2017 | Santhanam et al. |
| 2017/0150415 A1 | 5/2017 | Kapoulas et al. |
| 2017/0223601 A1 | 8/2017 | Egner et al. |
| 2017/0265204 A1 | 9/2017 | Paria |
| 2017/0290084 A1 | 10/2017 | Wu et al. |
| 2018/0020417 A1 | 1/2018 | Catovic et al. |
| 2018/0146410 A1 | 5/2018 | Cho et al. |
| 2018/0160441 A1 | 6/2018 | Egner et al. |
| 2018/0197257 A1 | 7/2018 | Bender et al. |
| 2018/0255505 A1 | 9/2018 | Thyagarajan et al. |
| 2019/0132784 A1 | 5/2019 | Thubert et al. |
| 2019/0362447 A1 | 11/2019 | Bender et al. |
| 2020/0045581 A1 | 2/2020 | Dong et al. |
| 2020/0107338 A1 | 4/2020 | Egner et al. |
| 2020/0178137 A1* | 6/2020 | Hassan Hussein ......................... H04W 36/00837 |

* cited by examiner

DETERMINING A CELL TO WHICH TO CONNECT USER EQUIPMENT

CROSS-REFERENCE TO RELATED APPLICATIONS

This application is a continuation of U.S. patent application Ser. No. 17/244,281, filed on Apr. 29, 2021, entitled DETERMINING A CELL TO WHICH TO CONNECT USER EQUIPMENT, which is hereby incorporated by reference in its entirety.

BACKGROUND

One of the primary problems in the current wireless telecommunication network is that the mobile device currently utilizes the signal strength and priority of a layer from the site to decide to which layer or cell to connect. However, the cells with the strongest signal strength may not provide the best quality of service because even though the signal is strong, the cell may not provide sufficient downlink throughput, uplink throughput, latency, etc. Another common problem is that when none of the cells has a signal strength that dominates over the others, the mobile device can ping-pong between the cells by frequently switching connections among the cells having comparable signal strengths. This ping-ponging can cause an increase in latency, lower throughput, and a higher number of dropped calls. Other problems likewise exist with cell connectivity.

BRIEF DESCRIPTION OF THE DRAWINGS

Detailed descriptions of implementations of the present invention will be described and explained through the use of the accompanying drawings.

Figure 1:
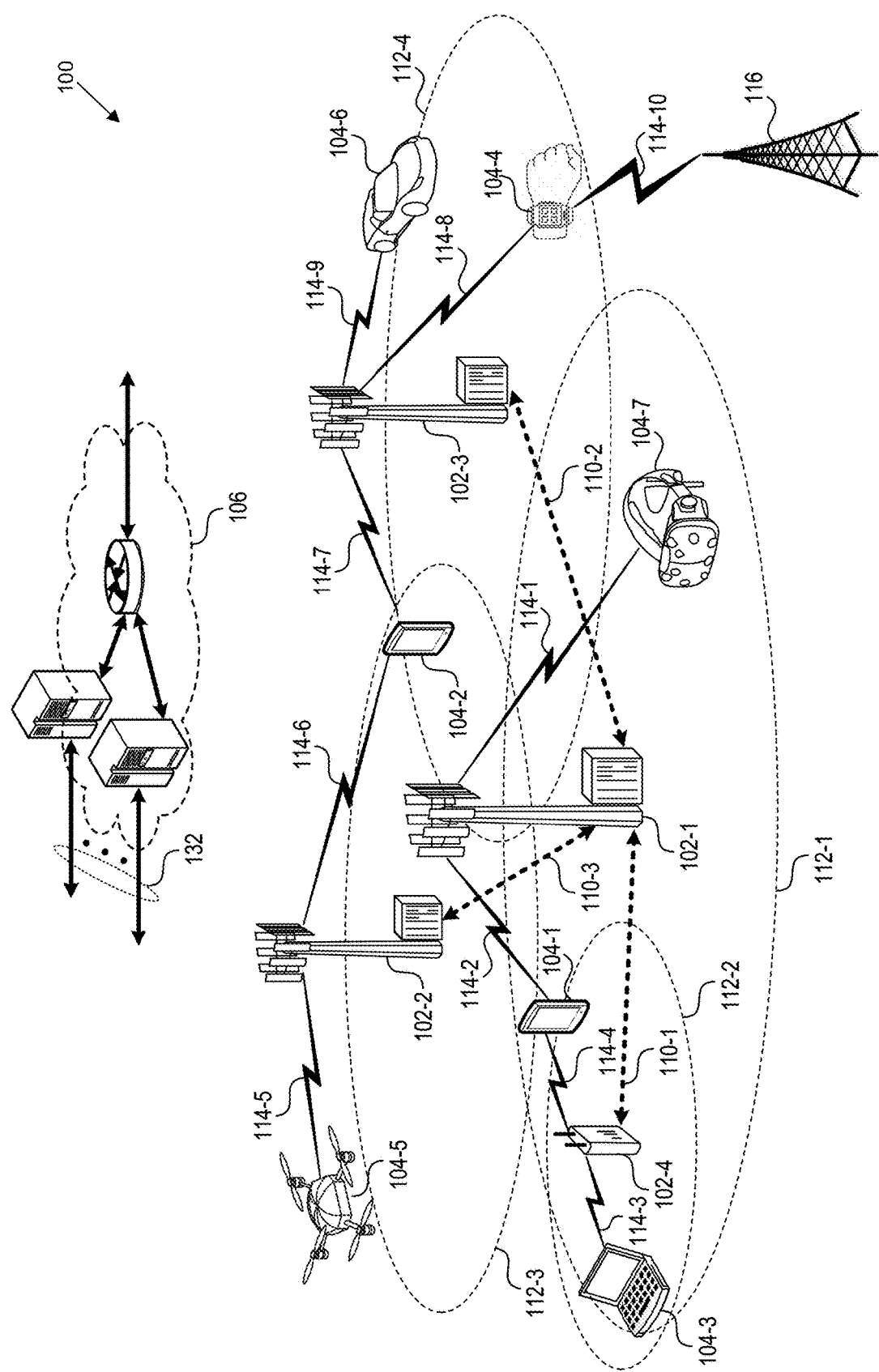
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

A wireless telecommunication network can provide a mobile device with a dynamic optimal layer selection (OLS) message so that the mobile device can connect, maintain, or reconnect, in idle or connected mode, to another cell and/or another layer based on a relevant technical attribute of the cell or the layer, as opposed to signal strength alone. The relevant technical attribute can include high throughput, fewer dropped calls, low latency, etc. The OLS message can include a collection of contours, or polygons representing a geographical area in two dimensions, three dimensions, or both. This OLS message can also include various data to indicate to the mobile device which layer to select, such as a region served by a cell, an indication of a generation of wireless technology provided by the cell, a radio frequency band provided by the cell, and a priority indicating an availability of the relevant technical attribute associated with the cell. The mobile device can determine the relevant technical attribute automatically, or the mobile device can prompt the user to indicate the relevant technical attribute. In addition, the interpretation of the OLS message can prevent the mobile device from ping-ponging between cells when the mobile device is stationary.

Wireless Telecommunication System

FIG. 1 is a block diagram that illustrates a wireless telecommunication network 100 ("system 100") in which aspects of the disclosed technology are incorporated. The system 100 includes base stations 102-1 through 102-4 (also referred to individually as "base station 102" or collectively as "base stations 102"). A base station is a type of network radio access node (RAN) that can also be referred to as a cell site, a base transceiver station, or a radio base station. The system 100 can include any combination of RANs including an access point, radio transceiver, gNodeB (gNB), NodeB, eNodeB (eNB), Home NodeB, or the like. In addition to being a wireless wide area network (WWAN) base station, a RAN can be a wireless local area network (WLAN) access point, such as an Institute of Electrical and Electronics Engineers (IEEE) 802.11 access point.

The RANs of a network formed by the system 100 also include wireless devices 104-1 through 104-7 (referred to individually as "wireless device 104" or collectively as "wireless devices 104") and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X2 interfaces), which can be wired or wireless communication links.

The base stations 102 can wirelessly communicate with the wireless devices 104 via one or more base station antennas. The cell sites can provide communication coverage for geographical coverage areas 112-1 through 112-4 (also referred to individually as "coverage area 112" or collectively as "coverage areas 112"). The geographical coverage area 112 for a base station 102 can be divided into sectors making up only a portion of the coverage area (not shown). The system 100 can include base stations of different types (e.g., macro, micro, pico, femto, and/or small cell base stations). In some implementations, there can be overlapping geographical coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The system 100 can include a 5G network and/or an LTE/LTE-A or other network. In an LTE/LTE-A network, the term eNB is used to describe the base stations 102, and in 5G new radio (NR) networks, the term gNBs is used to describe the base stations 102. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographical area (e.g., several kilometers in radius) and can allow access by wireless devices that have service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographical area and can allow unrestricted access by wireless devices that have service subscriptions with the network provider. A femto cell covers a relatively smaller geographical area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are RANs, including small cells.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-7, a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in system 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Determining the Cell to which to Connect, Re-Connect, and Maintain the UE

Figure 2:
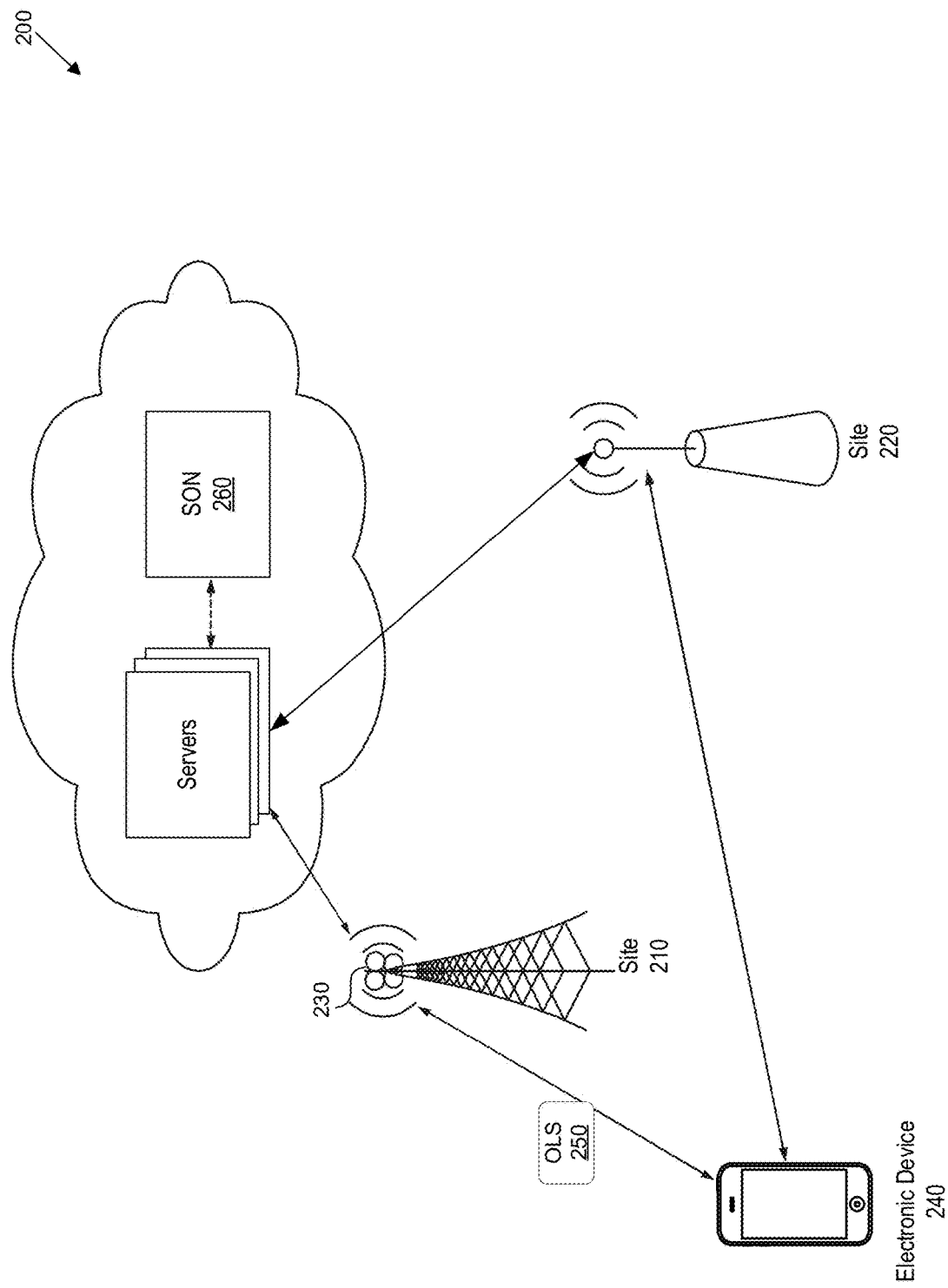
FIG. 2 shows a wireless telecommunication network providing an optimal layer selection (OLS) message to a user equipment (UE).

FIG. 2 shows a wireless telecommunication network providing an OLS message to a UE. A wireless telecommunication network 200 ("network 200") can include multiple sites 210, 220. A site 210, 220 is a single physical structure. A single site can have multiple cells 230 (only one labeled for brevity). A cell 230, e.g., a layer, is a logical concept which contains physical resources such as antennas.

Each cell 230 is defined by the generation of wireless technology, band, and carrier. Generation of wireless technology can be GSM, UMTS, CDMA, EV-DO, LTE, NR, 5G, 3G, etc. A band can be B2 (Personal Communication Services—"PCS"), B4 (Advanced Wireless Service—"AWS"), B12 (700 MHz), B71 (600 MHz), etc. The carrier can be labeled as 1, 2, 3, etc. Each generation of technology has a maximum bandwidth in each band and once the bandwidth is exhausted, a new carrier, on the same band, is needed. The default carrier is 1. Channel is a center number/frequency of the corresponding carrier.

For example, LTE bands have a maximum of 20 MHz. Carrier 1 in an LTE band can operate 1930 MHz to 1950 MHz, while carrier 2 can operate 1965 MHz to 1985 MHz. In another example, UMTS bands have a maximum of 5 MHz. Carrier 1 in a UMTS band can operate 1930 MHz to 1935 MHz, carrier 2 can operate 1935 MHz to 1940 MHz, carrier 3 can operate 1940 MHz to 1945 MHz, while carrier 4 can operate 1945 MHz to 1950 MHz.

A UE 240 can establish a connection with the network 200 by connecting to a cell 230. After the UE 240 is connected to a cell (via current protocols in idle or connected modes), the UE will inform the network 200 of its ability to accept an OLS message 250. The UE 240 must be able to connect to a satellite positioning system or other accurate positioning technology (such as an indoor or campus- or venue-wide positioning system) and must be operational as the present system can rely on the UE to have accurate geographic positioning. Once the UE 240 confirms (either automatically and/or prompting the user to confirm every so often) that the location is operational and relatively accurate, the UE informs the network 200 that the UE can start accepting an OLS message. The UE 240 can ask the network 200 to send an OLS message 250 every time it is served by a new cell or when the UE is on the far edge of the contour in the OLS message. The OLS message 250 can indicate to the UE 240, as described in FIG. 3, when to request a new OLS message.

The OLS message 250 is a new data structure message that is sent from the network 200 to the UE 240. Typically, the OLS message 250 is based on a geographic information system (GIS) vector format along with metadata and data to help the UE decide what to do upon receiving this message, as described in FIG. 3. The OLS message 250 uses a vector format, preferably TopoJSON because the OLS message is designed to be as small as possible, to preserve telecommunication network bandwidth. The OLS message 250 can also be a GeoJSON formatted structure that provides the contours, and/or can be defined by the 3rd Generation Partnership Project (3GPP) organization.

After the network 200 acknowledges that the UE 240 is capable of receiving an OLS message 250, the network can obtain the latest OLS message from a self-organizing network (SON) 260 platform and can send the OLS message 250 to a site 210, 220, which then forwards the OLS message to the UE. In addition to the OLS message 250, the network 200 can provide additional attributes in a system information block (SIB). For example, two SIB attributes that indicate a period of time and a number of times the UE should reject a provided OLS message before ceasing to re-request the OLS message from the same cell 230. In other words, the SIB attributes can include the quantity, representing the number of rejections, and the period of time, represented in minutes or seconds. The network 200 can obtain the latest OLS message 250 from the SON 260.

The SON 260 is an automation technology designed to make the planning, configuration, management, optimization, and healing of mobile radio access networks simpler and faster. SON 260 functionality and behavior has been defined and specified in generally accepted mobile industry recommendations produced by organizations such as 3GPP (3rd Generation Partnership Project) and the NGMN (Next Generation Mobile Networks). The SON 260 can generate an OLS message 250 per cell. Further, the network 200 can retrieve the OLS message 250 from the SON 260, and can forward the OLS message to the UE 240.

The SON 260 can generate a large OLS message for the entire market, but can also segment the geography representing the entire market in smaller-sized areas. Subsequently, the SON 260 can generate an OLS message 250 for each of the smaller-sized areas. Upon retrieving the OLS message from the SON 260, the network 200 can transmit the OLS message 250 to the UE 240. The SON 260 can generate the OLS message 250 at varying intervals that can depend on the geographical area, processing capabilities of the SON 260, and other factors.

The SON 260 can create one or more OLS messages 250. How often and how large the OLS messages are can dependent on engineers, machine learning/artificial intelligence, computer performance, etc. UE 240 can ask the base transceiver station 230, 220 for an OLS message 250. In turn, the base transceiver station 230, 220 asks the network 200 to request the latest OLS message 250 from the SON 260.

There are many permutations of what is considered the "best" layer for a UE 240 at a given location and time. A layer can include a combination of site, sector, technology, band, and carrier, as explained above. Thus, the SON 260 based on the inputs of engineers from the network 200 can determine the best layer and update the logic for determining the best layer over time. The SON 260 can create a new OLS message 250 every month, week, day, hour, minute, etc. Based on the processing power of the SON 260 and the dynamic nature of the wireless telecommunication network 200, the network 200 can decide how often a new OLS message 250 can be generated. The decision can be made based on input from engineers and/or based on a recommendation from an artificial intelligence (AI). The OLS message 250 can also be generated for the entire market at one interval and then for certain other geographical areas at a different interval.

After the UE 240 receives the OLS message 250, the UE can verify the OLS message's authenticity. To perform authenticity verification, the UE 240 can use metadata contained in the OLS message, as well as hashing and/or encryption methods. The reason to verify the authenticity of the OLS message 250 is that the OLS message can be compromised, and can instruct the UE 240 to do something that is not beneficial to the UE 240 and/or the network 200. The UE 240 can also check whether its current position is within the contours specified by the OLS message 250. If not, the UE 240 rejects the OLS message 250 and instructs the network 200 to send an updated OLS message. The UE 240 can stop asking the network 200 for another OLS message of the current cell 230 if the UE rejects OLS messages after X times within Y minutes, where X and Y are predetermined quantities such as 10 and 5, respectively. These X and Y attributes can be contained within the system information blocks (SIBs) as described in this application.

In addition, the OLS message 250 may have time-based expiration. Once the expiration time is reached, the UE 240 can re-request another OLS message. The expiration time ensures that the OLS message received by the UE 240 does not become stale, for example when the validity of the contours is time dependent. Once the UE 240 accepts the OLS message 250, the UE 240 can decide to potentially re-select another layer.

The switching of the layer based on the OLS message 250 can be used with existing layer switching methods. The layer switching based on the OLS message 250 can be an additive logic that supersedes the current logic if all conditions specified in the OLS message are met, such as the OLS message is not stale, the UE is within the contours specified by the OLS message, and the priority of the OLS message indicates a particular layer to which the UE 240 should connect.

Figure 3:
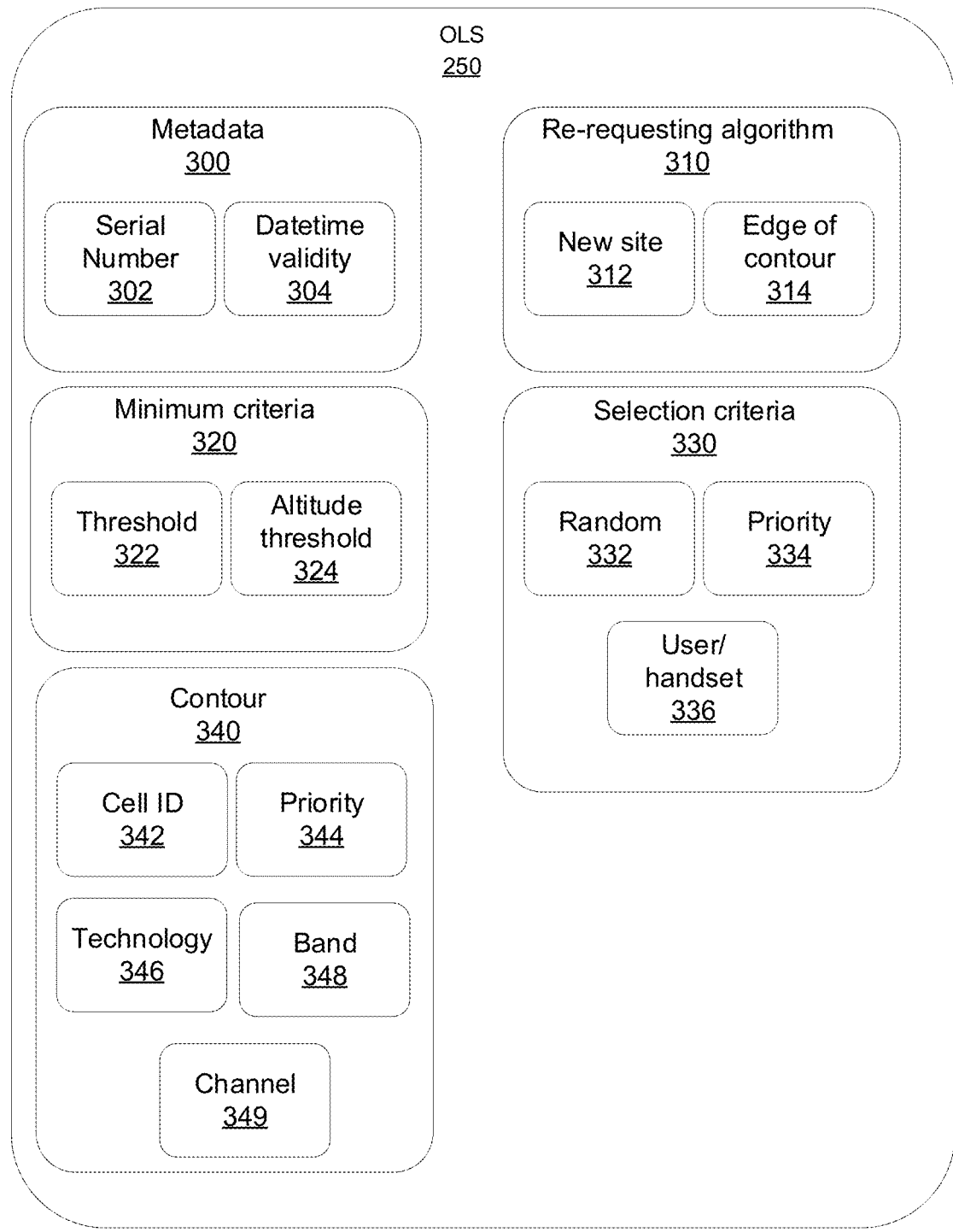
FIG. 3 shows the contents of an OLS message.

FIG. 3 shows the contents of an OLS message. The OLS message 250 can contain information about one or more cells. The OLS message 250 can include metadata 300, re-requesting algorithm 310, minimum criteria for selecting contour 320, selection criteria for overlapping contours 330, and contours 340.

The metadata 300 can include a serial number 302 associated with the OLS message 250, and a datetime validity 304. The serial number 302 can be generated according to a predetermined algorithm, such as a cryptographic algorithm, and can indicate the validity of the OLS message. For example, if the serial number is not generated according to the predetermined algorithm, the UE 240 can determine that the OLS message 250 is invalid. The serial number 302 can uniquely identify the OLS message 250. Similarly, the datetime validity 304 can indicate a time when the OLS message 250 expires. The expiration date of the OLS message ensures that the OLS message 250 does not become stale, as described in this application. For example, the OLS message 250 can be generated by the hour in an area where cellular and data traffic demands change very quickly. The datetime validity 304 can ensure that the UE is not using an old OLS message.

The re-requesting algorithm 310 can include an indication 312 to the UE 240 in FIG. 2 to request an OLS message when the UE is served by a new site, or an indication 314 to the UE to request an OLS message when the UE is within an indicated threshold away from the edge of the contour. The threshold in indication 314 can be expressed in meters. For example, the UE 240 can get the OLS message 250 containing contours of two sites, site A and site B, where each site has five layers. That means that the UE 240 gets ten contours, five contours from site A and five contours from site B. Initially, the UE 240 can connect to site A. If the UE 240 is moving, at some point the UE has to request a new OLS message. If the re-requesting algorithm 310 indicates that the UE 240 should request the new OLS message when the UE is served by the new site, when the UE 240 switches from site A to site B, the UE can request a new OLS message. If the requesting algorithm 310 indicated that UE 240 should request the new OLS message when the UE 240 is the indicated threshold away from the edge of the contours contained in the OLS message 250, the UE can check whether the UE is within the indicated threshold to the edge of a perimeter containing all ten contours. When the UE 240 is within the indicated threshold to the edge of the perimeter contained in the OLS message 250, the UE can request a new OLS message. Requesting a new OLS message when close to the edge of the contour, as opposed to when served by the new site, can be useful when the original OLS message covers a large geographical area and/or when the UE is moving slowly.

The minimum criteria for selecting contour 320 can include a threshold 322 and an altitude threshold 324. The threshold 322 can indicate the strength that the signal associated with the contour has to match or exceed. The altitude threshold 324 can be specified per contour, as described below in this application. The altitude threshold 324 can indicate the altitude at which the UE 240 needs to be before selecting the contour associated with the altitude threshold 324.

The selection criteria for overlapping contours 330 can be used by the UE 240 to distinguish between multiple contours that satisfy the UE 240 criteria and that the UE can select. For example, the UE 240 can obtain criteria based on which UE can accept or reject the OLS message 250. The criteria can include whether the OLS message is within the expiration date, whether the OLS message serial number is valid, whether the UE 240 is located within the contour outlines, whether the UE has rejected the OLS message a predetermined number of times within a predetermined time period, whether the contours provide a signal strength above the threshold 322, whether the UE is located within the altitude threshold 324, and/or whether the UE has the technological ability to communicate with each layer associated with each of the two contours. The selection criteria 330 can indicate how to select between the two contours.

For example, the selection criteria can be random 332, prioritized 334, or specific to a user/handset 336. When the selection criteria is random 332, the UE 240 can randomly select between the two contours. However, if the UE 240 is currently connected to one of the two contours, the UE will preserve the existing connection, without switching the other contour, to prevent ping-ponging between contours. When the selection criteria is prioritized 334, each contour includes a priority. The UE 240 selects the contour with the highest priority. The priority can be determined by the network 200 in FIG. 2, and can indicate a cell with a higher capacity, such as a cell providing lower latency, higher throughput, faster downlink throughput, faster uplink throughput, and/or fewer calls being disconnected unintentionally, etc. The priority can be dependent on a technical attribute of the wireless connection that is relevant to the UE 240, as described in this application.

When the selection criteria are specific to a user/handset 336, the OLS message 250 can contain groupings of contours specific to the user/handset. For example, a contour that is specific to the user can rely on a user profile associated with the network 200. In a more specific example, if the UE 240 associated with the user is 5G enabled, however the user is not subscribed to a 5G plan and instead is subscribed to a 4G plan, the OLS message specific to the user will indicate contours that provide 4G or lower generation service. The UE 240 can select a contour within the OLS message 250, either randomly or based on priority, depending on whether a random 332 or prioritized 334 instruction is included in the OLS message 250.

The contour 340 can include a global cell identifier (ID) 342, priority 344, generation of technology 346, band 348, and channel 349. The generation of technology 346, the band 348, and the channel 349 specify the layer providing wireless connection within the contour 340. The contour 340 also indicates a geographical area covered by the layer.

Prior to receiving the OLS message 250, in one embodiment, the UE 240 can prompt the user to indicate what the user wants in terms of experience priority, e.g. a relevant technical attribute of the network 200 in FIG. 2, such as faster downlink throughput, faster uplink throughput, fewer calls being disconnected unintentionally (i.e., dropped calls), lower probability of calls being blocked, lower latency, etc. In another embodiment, the SON 260 in FIG. 2 can utilize machine learning and/or artificial intelligence to determine the relevant technical attribute. The UE 240 can also prompt a user to confirm the user's location and/or specify the altitude of the user, such as what floor of a building the user is on.

The UE 240 can also include satellite positioning hardware and software. For example, the satellite positioning system in the United States is the global positioning system (GPS), while in China it is BeiDou, in Europe it is Galileo, in Russia it is GLONASS, in India it is NavIC, and in Japan it is QZSS.

In addition, the OLS message 250 can also contain an attribute (per contour) indicating a value from 0 to 100%. The UE 240 can use the attribute to select a contour based on the UE's mobility. For example, 0% attribute value indicates 0% probability that mobile is moving (in other words, UE 240 is stationary). 100% attribute value indicates 100% probability that mobile is moving and moving fast (in other words, UE 240 is in a car or train).

Because the UE 240 is using GPS, before the device gets an OLS 250, the UE can pre-calculate it's mobility probability. For example, the UE 240 can determine that the attribute value is 45%. Then, the UE 240 can only select a contour if contour's attribute value is smaller than the UE's. For example, Contour A attribute value=30%
Contour B attribute value=60%
Contour C attribute value=40%.

In that case, the UE 240 can only select between contours A and C. Contour B is excluded since contour B attribute value is greater than 45%.

Figure 4:
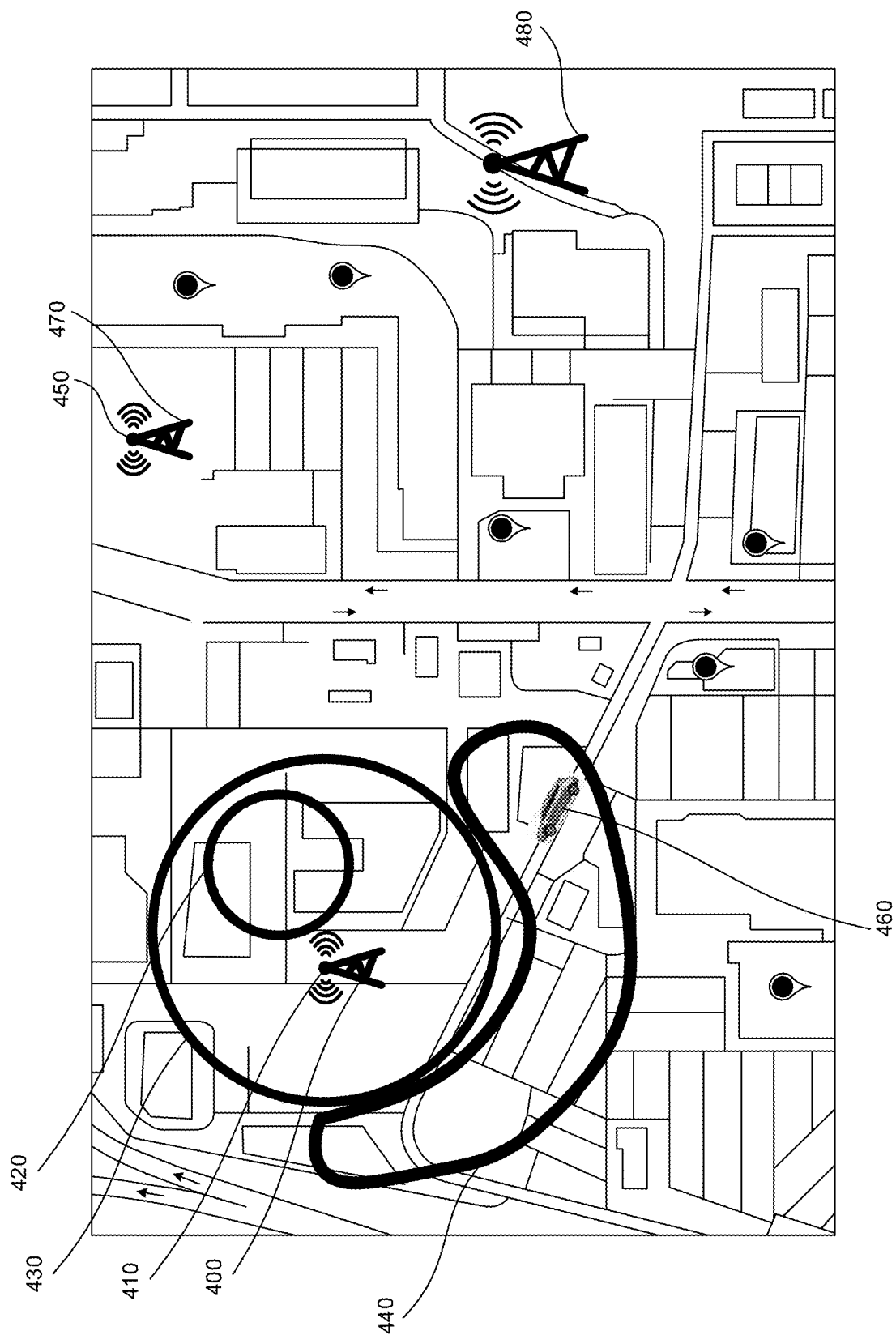
FIG. 4 shows contours provided by an OLS message.

FIG. 4 shows contours provided by an OLS message. Site 400 has one cell 410. The cell 410 can send three contours 420, 430, 440 in the OLS message 250 in FIG. 2 to the UE 460. The contour 440 is associated with a PCS layer, the contour 430 is associated with an AWS layer, and the contour 420 is associated with a 700 MHz layer. If the UE is within the contour 440, the UE connects to the PCS layer. If the UE 240 is within contour 430, the UE connects to the AWS layer. If the UE 460 is within contour 420, the UE can connect to either the AWS layer or the 700 MHz layer. When two or more contours overlap, such as contours 420, 430, the UE 240 can select the contour randomly, by rank, and/or by user/handset as described in this application. The OLS message 250 can contain the selection criteria 330 in FIG. 3, indicating to the UE 460 how to select the contour.

In practice, all populated areas can be assigned one or more contours and the same contours in an OLS message can be sent by more than one cell. Each cell 410 can transmit contours not just for itself, but for other sites 470, 480 and/or cells 450 so that the UE 460 can be ready to hand over. In one embodiment, each cell 410, 450 can send all the contours in an OLS message 250 for the entire city or market.

The UE 240 can be served by other cells 450 in the network 200 as the UE 460 moves (e.g., driving on a highway). The UE 460 can re-request the OLS message when served by a new cell, or when close to the boundary of a contour 420, 430, 440, as described in this application. However, if the OLS message 250 instructs the UE 460 to only re-request a new OLS message when the UE 460 determines it is near a boundary of the contour 420, 430, 440, the initial OLS message 250 can be larger than normal because the OLS message needs to include contours of neighboring cells 450 to inform the UE 460 to which cell to connect once the boundary of the current contour is reached. Therefore, there is a tradeoff between the size of an OLS message vs. how often the UE requests a new OLS message.

The UE 460 constantly needs to know its current global position and check against the contours 420, 430, 440 to know when to switch to another layer, switch to another site, or re-request another OLS message. Communicating with a satellite positioning system can consume power and hence drain the battery.

Figure 5:
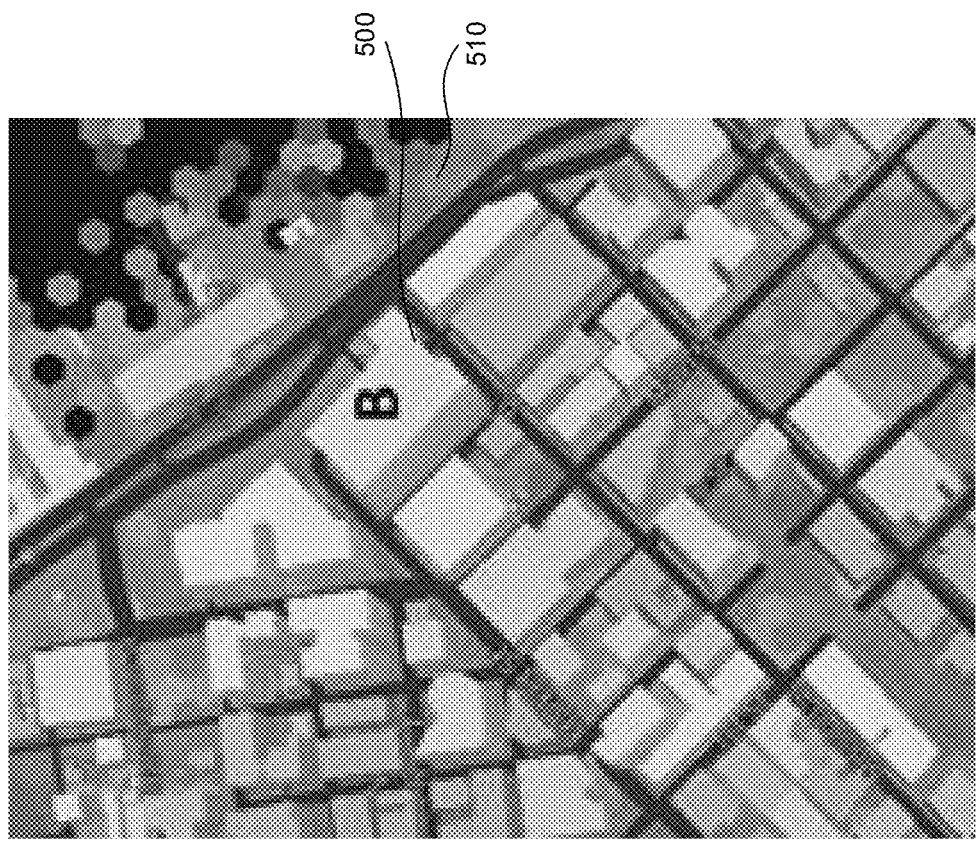
FIG. 5 shows a three-dimensional map that can be utilized by the OLS message.

FIG. 5 shows a three-dimensional map that can be utilized by the OLS message. In addition to two-dimensional OLS message contours 420, 430, 440 in FIG. 4, depending on the location, such as in downtown cities where there are many high-rise buildings, the OLS message can contain three-dimensional OLS message contours based on altitude. If a UE determines that it is within a three-dimensional contour and that the UE has an altitude reading from the satellite positioning system, the UE can then select the appropriate contour automatically. If the UE thinks the altitude data is not reliable or is missing, the UE can also ask the user to confirm which floor of the building 500 the user is on.

The three-dimensional contour is also beneficial for an outdoor stadium where there is no distributed antenna system (DAS). Depending on where the user is located, a different site and/or layer might be preferred. The contours can be as small as a section of the seating areas.

For example, the building 500 can have ten floors. Thus, the OLS message from a nearby site 510 can include ten contours for each floor, or fewer, such as three contours. Each contour can specify the altitude value required in order to select this layer. To generate the altitude values, the SON 260 in FIG. 2 can have information about the height per each floor, or can have a default floor height.

Figure 6:
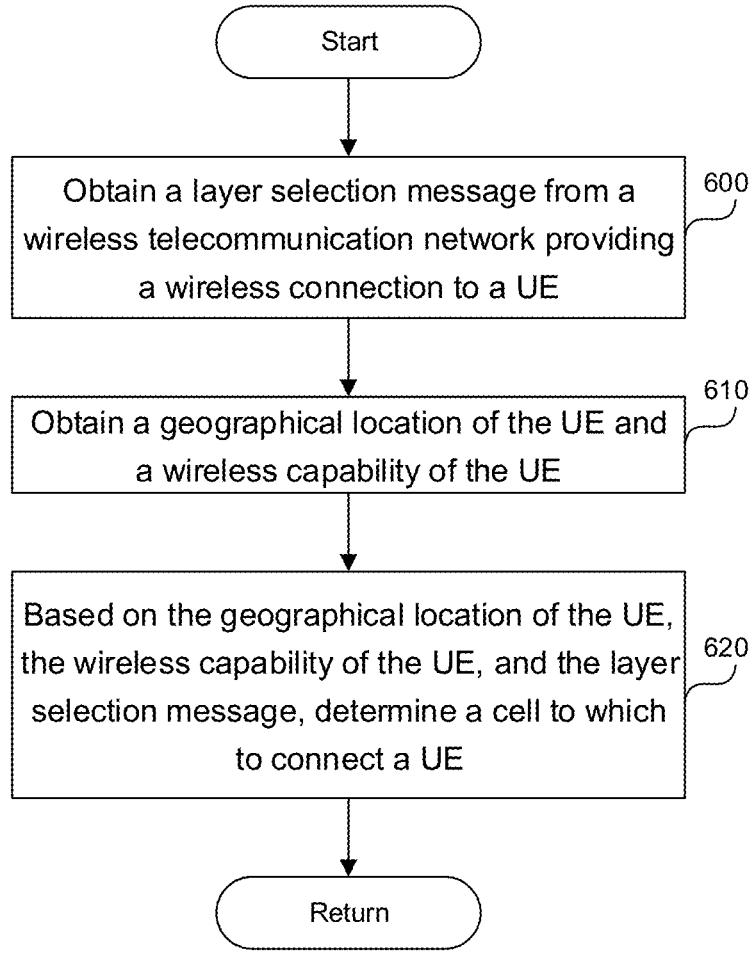
FIG. 6 is a flowchart that illustrates a process to determine a cell which can connect, reconnect, or maintain a connection to a UE.

FIG. 6 is a flowchart that illustrates a process to determine a cell which can connect, reconnect, or maintain a connection to a UE. In step 600, a hardware of a software processor executing instructions described in this application can obtain a layer selection message from a wireless telecommunication network providing a wireless connection to a UE. The UE can be any device used directly by an end user to communicate, such as a mobile phone, tablet, laptop, smartwatch, vehicle, etc. The layer selection message can be the OLS message, and can include a contour including an indication of a region served by a cell, an indication of a generation of wireless technology provided by the cell, a radio frequency band provided by the cell, and an indication of how to select the cell. The indication of how to select the cell can include a priority indicating an available capacity associated with the cell. The capacity can be latency, downlink throughput, uplink throughput, number of calls being disconnected unintentionally (i.e., dropped calls), probability of calls being blocked, etc. The indication of how to select the cell can include selection criteria 330 in FIG. 3.

In step 610, the processor can obtain a geographical location of the UE and a wireless capability of the UE, such as whether the UE is enabled for 5G, 4G, 3G, etc. In step 620, based on the geographical location of the UE, the wireless capability of the UE, and the layer selection message, the processor can determine the contour and consequently the cell to which to connect the UE. The cell can be the same cell to which the UE is currently connected, can be a cell to which the UE has been previously connected, or can be a cell to which the UE has never been connected.

To determine the cell to which to connect, re-connect, or maintain the connection to the UE, the processor can, based on the wireless capability of the UE, determine whether the UE can engage with the generation of wireless technology provided by the cell, and determine the radio frequency band provided by the cell. For example, the processor can determine that the UE is a 5G UE and that the cell is a 5G cell, and that a band provided by the 5G cell can be received by the UE. Based on the geographical location of the UE and the region served by the cell, as described by the contour, the processor can determine whether the UE is located within the region served by the cell. The processor can obtain a selection criterion included in the layer selection message.

The selection criterion indicates a method to select the cell such as a random selection or a selection based on the priority associated with the contour as described in FIG. 3. Upon determining that the UE is located within the region served by the cell, and that the UE can engage with the generation of wireless technology and the radio frequency band provided by the cell, the processor can establish the wireless connection between the UE and the cell based on the selection criterion.

To determine a priority of a contour, the processor can determine a technical attribute of the wireless connection relevant to the UE, where the technical attribute can include low latency, faster downlink throughput, faster uplink throughput, and/or fewer calls being disconnected unintentionally. For example, if the user is playing video games on the UE, low latency is relevant, and if the user is engaged in a voice call, low number of dropped calls is relevant, while if the user is watching a movie, high downlink throughput is relevant. The processor can determine the relevant technical attribute automatically by determining the active application of the UE, or the processor can ask the user to indicate the relevant technical attribute. The processor can determine a priority associated with a contour of the cell based on the technical attribute and an ability of the cell to provide the technical attribute to the UE. For example, if the cell has low latency, but a high number of dropped calls, and the user is involved in a voice call, the processor assigns a low priority to the cell.

To select an appropriate contour where altitude is relevant, the processor can obtain the layer selection message including multiple contours and multiple altitude values corresponding to the multiple contours. An altitude value among the multiple altitude values indicates a particular altitude value required to select a particular contour among the multiple contours. The processor can determine an altitude value associated with the UE. Finally, the processor can select a contour whose altitude value corresponds to the altitude value associated with the UE.

To prevent the UE from ping-ponging between different contours, the processor can receive the layer selection message including multiple contours associated with multiple cells. The processor can determine that the OLS message does not indicate a preference for a particular contour among the multiple contours. For example, the OLS message can instruct the UE to select a contour randomly. The processor can determine that a cell currently providing the wireless connection to the UE is among the multiple cells. Finally, the processor can preserve the wireless connection to the cell currently providing the wireless connection to avoid ping-ponging.

To determine whether the layer selection message is valid, the processor can obtain the layer selection message including a datetime validity indicating whether the layer selection message has expired. Based on the datetime validity, the processor can determine whether the layer selection message has expired. Finally, upon determining that the layer selection message has expired, the processor can discard the layer selection message.

To determine whether to request a new layer selection message, the processor can obtain the layer selection message including an indication of an algorithm to use when requesting a new layer selection message. The algorithm can include a threshold, and an indication to request the new layer selection message when within the threshold of the contour. Finally, based on the geographical location of the UE and the layer selection message, the processor can determine whether to request a new layer selection message.

To reduce battery consumption of the UE, the processor can reduce the number of times the UE communicates with a satellite positioning system. The processor can obtain a prior location of the UE, an acceleration, and a velocity of the UE obtaining the location of the UE. The processor can determine the location of the UE based on the prior location, the acceleration, and the velocity, without using the satellite positioning system.

Computer System

Figure 7:
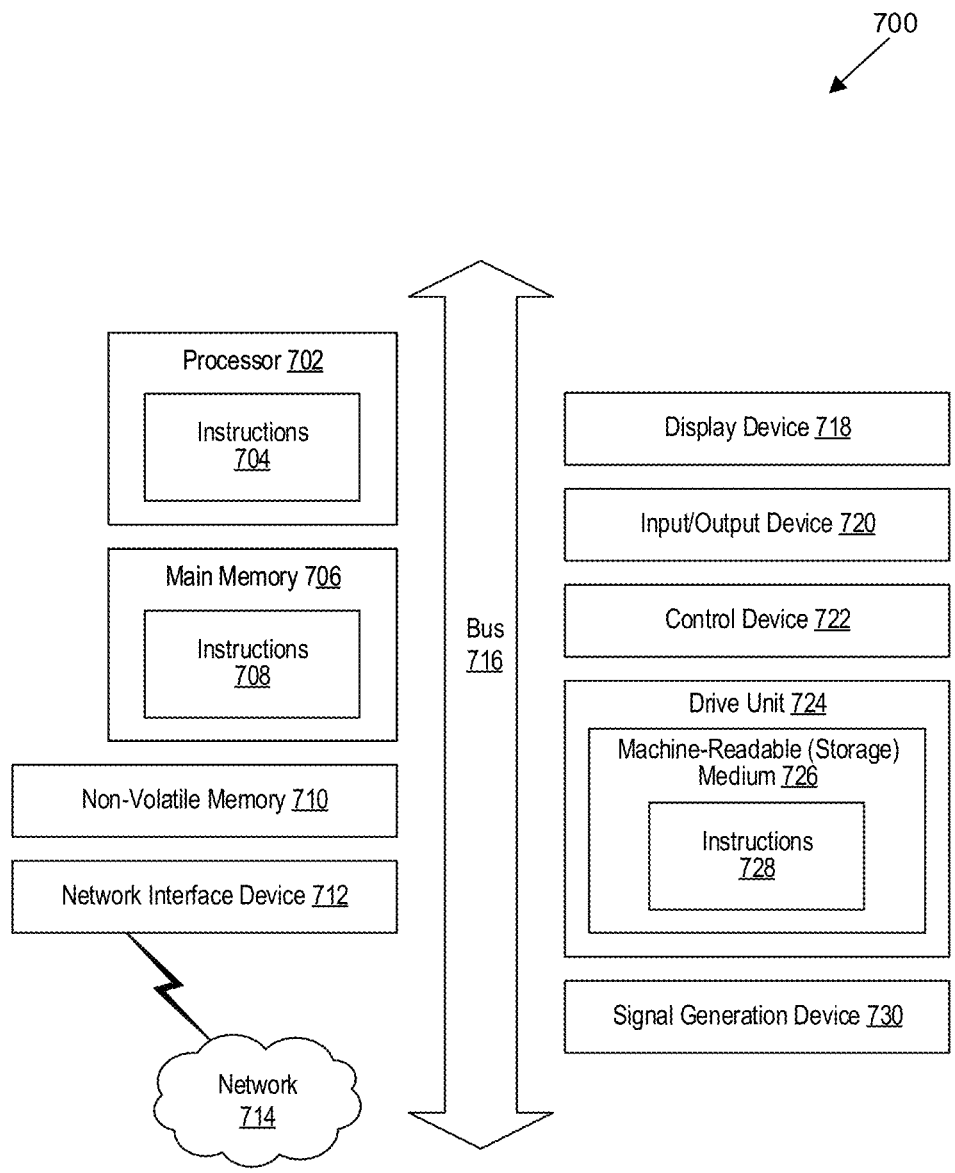
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a display device 718, an input/output device 720, a control device 722 (e.g., a keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The processor 702 can implement instructions described in this application, for example instructions described in FIG. 6. The processor 702 can be associated with the UE 240, 460 in FIGS. 2 and 4, respectively, or with the network 200 in FIG. 2. The main memory 706, the non-volatile memory 710, and/or the drive unit 724 can store the instructions as described in this application. The network 714 can be the wireless telecommunication network as described in this application.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementations, the computer system 700 can be an embedded computer system, a system-on-chip (SOC), a single-board computer system (SBC), or a distributed system such as a mesh of computer systems, or the computer system 700 can include one or more cloud components in one or more networks. Where appropriate, one or more computer systems 700 can perform operations in real time, in near real time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable (storage) medium 726) can be local, remote, or distributed. Although shown as a single medium, the machine-readable (storage) medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable (storage) medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated upon or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. At least one computer-readable storage medium, excluding transitory signals and storing instructions, which, when executed by at least one data processor, perform operations for use with a 5G or later generation wireless telecommunication network, the operations comprising:
  generate a layer selection message from the 5G or later generation wireless telecommunication network providing a wireless connection to a wireless mobile device,
    wherein the layer selection message includes a contour including an indication of a region served by a cell in the 5G or later generation wireless telecommunication network;
  send the layer selection message to the mobile device; and
  based on the layer selection message and a geographical location associated with the mobile device, cause the mobile device to determine a cell to which to connect.

2. The computer-readable storage medium of claim 1, further comprising the instructions to:
  based on a wireless capability of the mobile device, determine whether the mobile device can engage with the generation of wireless technology provided by the cell, and a radio frequency band provided by the cell;
  based on the geographical location of the mobile device and the region served by the cell, determine whether the mobile device is located within the region served by the cell;
  obtain a selection criterion included in the layer selection message,
    wherein the selection criterion indicates a method to select the cell,
    wherein the method includes a random selection or a selection based on a priority associated with the contour; and
  upon determining that the mobile device is located within the region served by the cell, and that the mobile device can engage with the generation of wireless technology and the radio frequency band provided by the cell, establish the wireless connection between the mobile device and the cell based on the selection criterion.

3. The computer-readable storage medium of claim 1, further comprising the instructions to:
  obtain, from the layer selection message, multiple contours and multiple altitude values corresponding to the multiple contours,
    wherein an altitude value among the multiple altitude values indicates a particular altitude value required to select a particular contour among the multiple contours;
  determine an altitude value associated with the mobile device; and
  select a contour whose altitude value corresponds to the altitude value associated with the mobile device.

4. The computer-readable storage medium of claim 1, further comprising the instructions to:
  obtain, from the layer selection message, multiple contours associated with multiple cells;
  determine that the layer selection message does not indicate a preference for a particular contour among the multiple contours;
  determine that the cell currently providing the wireless connection to the mobile device is among multiple cells; and
  preserve the wireless connection to the cell currently providing the wireless connection.

5. The computer-readable storage medium of claim 1, further comprising the instructions to:
  obtain from the layer selection message a datetime validity indicating an expiration time of the layer selection message;
  based on the datetime validity, determine whether the layer selection message has expired; and
  upon determining that the layer selection message has expired, discard the layer selection message.

6. The computer-readable storage medium of claim 1, further comprising the instructions to:
  obtain from the layer selection message an indication of a layer selection message-requesting algorithm to utilize,
    wherein the layer selection message-requesting algorithm comprises a threshold, and an indication to request a new layer selection message when within the threshold of the contour; and
  based on the geographical location of the mobile device and the layer selection message, determine whether to request a new layer selection message.

7. A system comprising:
  at least one hardware processor; and
  at least one non-transitory memory, coupled to the least one hardware processor and storing instructions, which, when executed by the at least one hardware processor, cause the system to:
    generate a layer selection message from a wireless telecommunication network providing a wireless connection to a user equipment (UE),
      wherein the layer selection message includes a contour including an indication of a region served by a cell;
    send the layer selection message to the UE; and
    based on the layer selection message and a geographical location associated with the UE, cause the UE to determine a cell to which to connect.

8. The system of claim 7, further comprising the instructions to:
  based on a wireless capability of the UE, determine whether the UE can engage with a generation of wireless technology provided by the cell and a radio frequency band provided by the cell;
  based on the geographical location of the UE and the region served by the cell, determine whether the UE is located within the region served by the cell; and
  obtain a selection criterion included in the layer selection message,
    wherein the selection criterion indicates a method to select the cell,
    wherein the method includes a random selection or a selection based on priority associated with the contour; and
  upon determining that the UE is located within the region served by the cell, and that the UE can engage with the generation of wireless technology and the radio frequency band provided by the cell, establish the wireless connection between the UE and the cell based on the selection criterion.

9. The system of claim 7, further comprising the instructions to:
 determine a technical attribute of the wireless connection, wherein the technical attribute is relevant to the UE, wherein the technical attribute includes low latency, low number of dropped calls, or high throughput; and
 determine a priority associated with the cell based on the technical attribute and an ability of the cell to provide the technical attribute to the UE.

10. The system of claim 7, comprising the instructions to:
 obtain the layer selection message including multiple contours and multiple altitude values corresponding to the multiple contours,
  wherein an altitude value among the multiple altitude values indicates a particular altitude value required to select a particular contour among the multiple contours;
 determine an altitude value associated with the UE; and
 select a contour whose altitude value corresponds to the altitude value associated with the UE.

11. The system of claim 7, further comprising the instructions to:
 receive, from the layer selection message, multiple contours associated with multiple cells;
 determine that the layer selection message does not indicate a preference for a particular contour among the multiple contours; and
 preserve the wireless connection to the cell currently providing the wireless connection.

12. The system of claim 7, further comprising the instructions to:
 obtain, from the layer selection message, a datetime validity indicating whether the layer selection message has expired;
 based on the datetime validity, determining whether the layer selection message has expired; and
 upon determining that the layer selection message has expired, discard the layer selection message.

13. The system of claim 7, further comprising the instructions to:
 obtain an indication of an algorithm to use when requesting a subsequent layer selection message from the layer selection message,
  wherein the algorithm comprises a threshold, and an indication to request a new layer selection message when within the threshold of the contour; and
 based on the geographical location of the UE and the layer selection message, determine whether to request the new layer selection message.

14. The system of claim 7, further comprising the instructions to:
 reduce battery consumption of the UE by:
  obtaining a prior location of the UE, an acceleration, and a velocity of the UE; and
  determining a location of the UE based on the prior location, the acceleration, and the velocity, without using a satellite positioning system.

15. A method for use with a wireless telecommunication network, the method comprising:
 providing, to a mobile device, a dynamic optimal layer selection (OLS) message to permit the mobile device to connect, maintain, or reconnect, in idle or connected mode, to another cell and/or another layer based on a technical attribute of the other cell or the other layer, as opposed to being based on signal strength alone;
  wherein the technical attribute includes high throughput, fewer dropped calls, or low latency, as compared to a current cell or a current layer that the mobile device is using;
  wherein the OLS message include a set of contours or polygons representing a geographical area in two dimensions, three dimensions, or both; and,
  wherein the OLS message includes data to indicate to the mobile device a region served by the other cell, an indication of a generation of wireless technology provided by the other cell, a radio frequency band provided by the other cell, or a priority indicating an availability of the technical attribute associated with the other cell.

16. The method of claim 15, wherein the mobile device determines the technical attribute automatically, or the mobile device prompts a user to indicate a desired technical attribute.

17. The method of claim 15, wherein interpretation of the OLS message prevent the mobile device from ping-ponging between cells when the mobile device is stationary.

18. The method of claim 15, further comprising:
 determining that the OLS message does not indicate a preference for a particular contour among multiple contours; and
 preserve a wireless connection to the current cell.

19. The method of claim 15, comprising:
 obtaining, from the OLS message, a datetime validity indicating whether the layer selection message has expired;
 based on the datetime validity, determining whether the layer selection message has expired; and
 upon determining that the OLS message has expired, discarding the layer selection message.

* * * * *